(No Model.)
J. E. EMERSON.
SAW.
No. 304,715.  Patented Sept. 9, 1884.
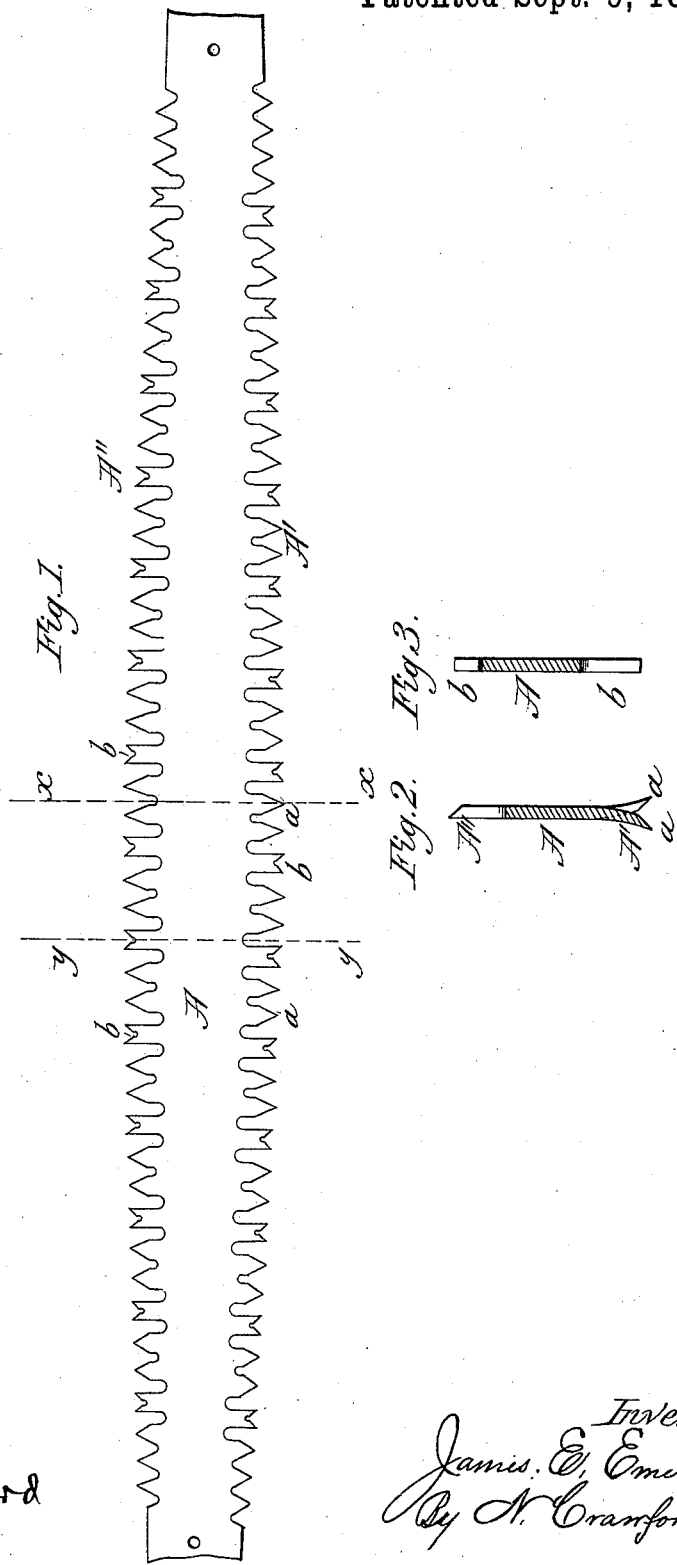
Attest.
F. H. Schott
N. W. Brelsford
Inventor:
James E. Emerson
By N. Cranford
atty.

UNITED STATES PATENT OFFICE.

JAMES E. EMERSON, OF BEAVER FALLS, PENNSYLVANIA.

SAW.

SPECIFICATION forming part of Letters Patent No. 304,715, dated September 9, 1884.

Application filed July 16, 1884. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Crosscut-Saws, of which the following is a specification, reference being had therein to the accompanying drawings.

My invention relates to improvements in crosscut-saws, the object of which is to produce a saw that will be so cheap that it will not pay the user to wear it so as to be necessary to gum it, or to even dress the teeth but a few times; and it consists in the construction of a very narrow saw-blade with slightly convex curved opposite edges, and having the usual scoring and clearing teeth on its opposite edges, with the scoring-teeth set to cut a kerf to clear the saw in sawing on but one edge, while the scoring-teeth on the opposite edge are not set, but remain of the same thickness as the saw-blade.

In the drawings, Figure 1 represents a side view of the saw. Fig. 2 represents a transverse sectional view on line $x\,x$, and Fig. 3 represents a transverse sectional view on line $y\,y$, Fig. 1.

A represents the saw-blade with teeth cut on opposite edges of the blade, which is narrow, much more so than saws generally are having the same length, and the cutting-edges of the teeth are upon a slightly convex curved line, so as to give the blade a greater width in the center of its length, and thereby give it more stiffness. The teeth A' and A'' on the opposite edges of the saw may be of any of the ordinary forms, or having scoring and clearing teeth, as usual, for crosscut-saws.

The teeth A', Fig. 2, are upon the lower or working edge of the saw, and show the scoring-teeth $a\,a$ set to cut the width of the kerf, while the upper or opposite teeth, A'', are not set, but remain on the same plane and thickness with the saw-blade A, so that there will not be any binding of the saw-blade in the kerf. The clearing-teeth $b\,b$, as seen in Fig. 3, are never set, as is always the case.

In use this construction of saw will be lighter, less liable to pinch or bind in the kerf, because of its being so much narrower than the common make of crosscut-saws, and is only intended to be filed at the points of the teeth a time or two and till the cutting-points are blunt, when the saw-blade is taken from the handles, the set in the scoring-teeth of A' hammered out, and the teeth A'' on the opposite edge are brought to be the cutting-teeth, and the scoring-teeth on that edge are set to cut the width of the kerf, when practically a new saw is brought into use.

The cost of the saw-blade is much less than that made of the common width of crosscut-saws, and will not be greater than the cost of twice dressing the saw-teeth. Consequently, when that has been done to both edges, the saw-blade can be laid aside and a new blade or saw can be put into use, and as the saw-makers have much better appliances and facilities for putting the saw in order for good work than the user ordinarily can have, it is economy to buy a new saw, rather than attempt to keep or pay for keeping a saw in working order after the points become blunt.

I lay no claim to a saw having teeth on opposite edges of the blade, because such saw-blades are in use; but the teeth on both edges of such saws have always been set, and, so being, will cause the saw to bind and scratch in the kerf, causing much more friction and requiring greater power to operate it.

Having thus described my invention, what I claim, and desire to secure by Letters Patent, is—

As a new article of manufacture, a narrow-blade crosscut-saw with curved opposite edges, each edge having the necessary teeth thereon, and the scoring-teeth on the working-edge only set to cut the kerf, the teeth on the opposite edge not being set, as described, and for the purposes set forth.

In testimony whereof I affix my signature in presence of two witnesses.

JAMES E. EMERSON.

Witnesses:
 NEWTON CRAWFORD,
 M. P. CALLAN.